A. GRAUEL.
PROCESS FOR RECOVERING POTASSIUM FROM POTASSIUM BEARING SILICATES.
APPLICATION FILED AUG. 6, 1917.
1,289,736.
Patented Dec. 31, 1918.
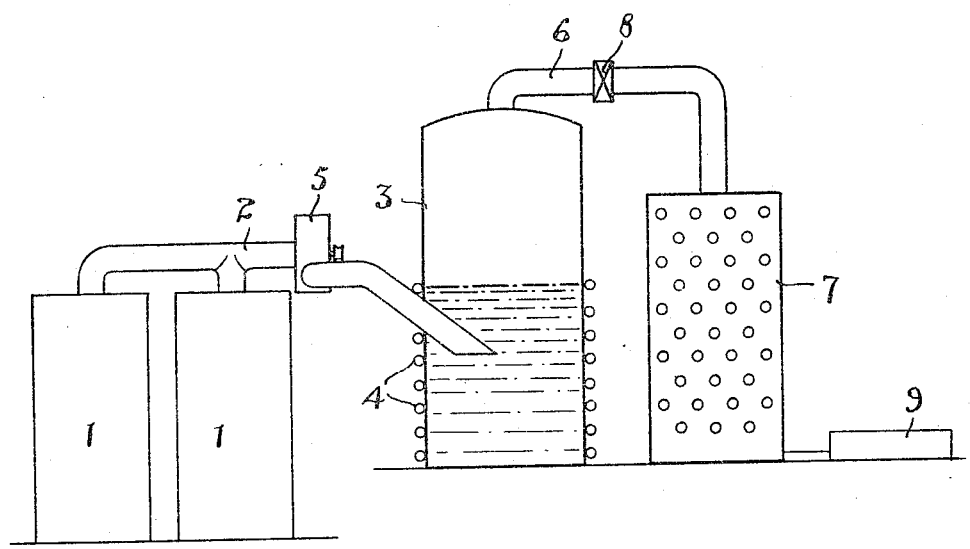
Inventor.
Allan Grauel
by
Att.

UNITED STATES PATENT OFFICE.

ALLAN GRAUEL, OF KITCHENER, ONTARIO, CANADA.

PROCESS FOR RECOVERING POTASSIUM FROM POTASSIUM-BEARING SILICATES.

1,289,736.     Specification of Letters Patent.     Patented Dec. 31, 1918.

Application filed August 6, 1917. Serial No. 184,566.

*To all whom it may concern:*

Be it known that I, ALLAN GRAUEL, a subject of the King of Great Britain, and resident of the city of Kitchener, county of Waterloo, Province of Ontario, in the Dominion of Canada, have invented certain new and useful Improvements in the Process of Recovering Potassium from Potassium-Bearing Silicates, described in the following specification and illustrated in the accompanying drawings, that form part of the same.

It is well known that many potash bearing silicates, such as feldspar, contain a considerable quantity of potassium and the principal object of this invention is to recover from such silicate potassium compounds in commercial quantities substantially free from impurities and to effect such recovery in a simple and economical manner.

The great difficulty experienced in previous methods where the action of heat is used to separate the potassium from the silicates, has been to collect or recover the volatile particles of potassium and the principal feature of this invention consists in rendering such particles water soluble by confining the fume within a saturating solution and then condensing the saturated fume and finally evaporating the solution to crystallization.

The accompanying drawing is a diagrammatic view of the apparatus used in carrying this invention into effect.

In calcining potassium bearing silicates the potassium is liberated at a very high temperature in atomical form and these atoms are so small and light that it has hitherto been found impractical to separate them from the remainder of the fume and arrest them.

The temperature at which the fume is handled prohibits the use of bag filters and the particles of potassium are too fine to be arrested in suitable quantity even if the temperature could be reduced.

Electrical precipitation has been tried with some degree of success but unless leaching is resorted to there is considerable loss and none of the products are pure.

In carrying the present invention into effect the raw material is calcined in a suitable kiln indicated by the numeral 1 in the diagram. The fume rising from the kiln is conducted through the flue 2 to a receiver 3 which is here shown in the form of a closed tank. This receiver is partly filled with a suitable saturating fluid, the level of which extends above the entrance of the flue 2 thereto so that the fume is introduced into the fluid.

The receiver 3 is heated in a suitable manner preferably by surrounding steam coils 4, to maintain the fluid under a boiling pressure of approximately forty pounds and the fume is forced into the receiver by a suitable pump 5. This pressure retains the fume in contact with the heated saturating fluid for a period which is sufficient to effectively saturate the potassium particles rendering them water soluble and it also effects the precipitation of the impurities in the fume, in the form of undesirable sodium compounds, and dust from coal and coke and from the silica rock.

The vapor rising from the boiling fluid contains the potassium compound and this vapor is conveyed from the top of the receiver through the conduit 6 to a suitable form of surface condenser 7, a relief valve 8 being arranged in said conduit to regulate the pressure in the receiver. The vapor is then condensed and the solution finally evaporated in a suitable evaporator 9 to crystal form and it is found that the resultant potassium compound is in a very pure state.

The saturation of the potassium particles is the crucial feature in the final arresting of such particles. It is found upon microscopic examination of the fume that the potassium particles are infinitesimally small and that they float in films or clouds and it is extremely difficult to bring them into cohering contact with a fluid to effect the penetration of the fluid into the chemical. It has been found in practice that in order to effect the desired penetration of fluid into the chemical atoms, otherwise saturation, both the fluid and the chemical must be brought to approximately uniform temperatures. The process herein described has the effect of forcing these chemical particles to amalgamate with the saturating fluid under an equalized temperature and the rising vapor carries the chemical with it and upon the vapor being condensed it is found that there is no insoluble potassium. The potassium compound is therefore fully recovered in a practically pure state as the impurities are not carried off with the vapor but are precipitated in the receiver.

The potassium may be recovered in caustic form by using clear water as the saturating fluid, or various compounds may be obtained by the introduction of other elements either into the raw materials to be calcined or into the saturating solution, for instance in order to produce potassium sulfate gypsum would be added to the raw material, or if potassium chlorid is desired the saturating solution would be calcium chlorid.

What I claim as my invention is:—

1. A process for recovering potassium from potash bearing silicates, consisting in volatilizing the potassium, then introducing the volatile fume into a preheated saturating fluid maintained at a boiling temperature to effect a substantial equalization of temperature between the fume and the fluid and finally condensing the saturated fume to crystallization.

2. A process for recovering potassium from potash bearing silicates, consisting in first applying heat to the silicate to liberate the potassium in a fume, then introducing the fume into a heated saturating fluid and maintaining it under pressure to effect the saturation of the potassium particles, and finally condensing the vapors rising from said heated fluid.

3. A process for recovering potassium from potash bearing silicates, consisting in first applying heat to the silicate to liberate the potassium in a fume, then introducing the fume into a saturating fluid contained in a receiver and heated to boiling under super-atmosphere pressure produced by the vapor from the liquid to effect the precipitation of impurities in the fume and the saturation of the potassium particles, then condensing the vapors rising from said heated solution, and finally crystallizing the potassium compound.

ALLAN GRAUEL.